United States Patent [19]

Fiedler

[11] 3,923,478

[45] Dec. 2, 1975

[54] PROCESS AND AN APPARATUS FOR RECOVERING ARSENIC TRIOXIDE FROM GASES

[75] Inventor: Utz Gerhard Fiedler, Helsingborg, Sweden

[73] Assignee: Boliden Aktiebolag, Stockholm, Sweden

[22] Filed: Feb. 11, 1974

[21] Appl. No.: 441,385

[30] Foreign Application Priority Data

Feb. 14, 1973 Sweden .............................. 7302076

[52] U.S. Cl. ...................... 55/68; 55/228; 423/617
[51] Int. Cl.² ......................................... B01D 47/00
[58] Field of Search ................... 55/72, 93, 94, 223; 23/294, 295; 423/87; 261/23 R

[56] References Cited
UNITED STATES PATENTS

| | | | |
|---|---|---|---|
| 1,182,544 | 5/1916 | Ferguson | 261/113 X |
| 3,726,065 | 4/1973 | Hausberg et al. | 261/DIG. 054 X |
| 3,803,804 | 4/1974 | Arashi et al. | 55/223 X |

*Primary Examiner*—John Adee
*Assistant Examiner*—Ethel Cross
*Attorney, Agent, or Firm*—Toren, McGeady and Stanger

[57] ABSTRACT

The invention refers to a process and to an apparatus for recovering arsenic trioxide from a gas by washing out said oxide from the gas with a liquid having the ability of dissolving arsenic trioxide. The invention is characterized thereby that non-desired deposits in the apparatus formed in connection with saturated solution are removed by dissolution with an unsaturated solution of arsenic trioxide.

8 Claims, 3 Drawing Figures

PROCESS AND AN APPARATUS FOR RECOVERING ARSENIC TRIOXIDE FROM GASES

The invention refers to a process and to an apparatus for recovering arsenic trioxide from a gas by washing out said oxide from the gas with a liquid having the ability of dissolving arsenic trioxide. The invention is particularly applicable in recovering arsenic trioxide from gases obtained in roasting of arsenic-containing sulphide materials, such as pyrites, and the invention has for its purpose to improve the technique to avoid the formation of non-desirable deposits in the apparatus used.

In the roasting of sulphide materials, a roasting gas is obtained, which contains sulphur dioxide, said sulphur dioxide, depending on the quality of the ore, being more or less contaminated by other volatile substances. A usual contaminant in this connection is arsenic trioxide. The purification of roasting gases from gaseous contaminants is usually done by washing the gases in an apparatus suitable for this purpose and with a wash liquid capable of removing the contaminants to the desired extent.

In case the gases contain valuable substances passing over to the wash liquid, such substances must be recovered therefrom. Usually the wash liquid is evaporated to supersaturation with regard to the substance to be recovered, said substance crystallizing in a solid form and being removable from the system by means of a suitable separating device.

In connection with super-saturation of the liquid it is, however, in many cases, difficult, not to say impossible, to avoid the formation of non-desirable deposits on the interior walls of the apparatus. These deposits are progressively built-up so as to make the apparatus inoperable in due time. Such problems are present when purifying roasting gases with regard to arsenic trioxide. The arsenic trioxide recovery is usually done by evaporating the wash liquid from the gas wash with subsequent separation of precipitated arsenic trioxide. In continuous operation this results in successive formation of very hard arsenic trioxide deposits in the apparatus, which are very difficult to remove.

Methods of preventing the formation of deposits of this type are known from, for instance, the German Pat. No. 975,974 and the Swedish Pat. No. 306,304.

From the German Pat. No. 975,974, it is known to remove primarily arsenic from the roasting gas by washing in a tower with concentrated sulphuric acid at a temperature of about 100°C. This will also result in cooling of the roasting gas by evaporation of sulphuric acid from about 300° to 100°C. In view of the solubility conditions for arsenic trioxide in concentrated sulphuric acid at different temperatures this results in obvious risks for deposition of arsenic trioxide in the apparatus. At high arsenic contents of roasted sulphide ore this process is not well suited from said reason.

A further development of this process is described in the Swedish Pat. No. 306,304, where consideration has been given to the solubility conditions of arsenic trioxide in sulphuric acid, in view of which the process operates within the concentration range 55–66 percent by weight of sulphuric acid at 100°C, such total arsenic trioxide content of the wash acid being furthermore maintained such that arsenic trioxide crystals are held in suspension in the acid.

Moreover, it is previously known from the Swedish Pat. No. 338,036 to operate with concentrations of the sulphuric acid of from 1–50 percent by weight, preferably 3–35 percent by weight.

In these prior art methods, sulphuric acid of such concentration is used as a wash liquid that severe requirements are put on the construction materials. According to the descriptions of the last-mentioned patent specifications, no deposits are formed in the apparatus at the prevailing conditions. However, it is difficult to constantly maintain such operational conditions which will guarantee that arsenic deposits are not formed in evaporating the arsenic-containing wash liquid. Deposits of arsenic trioxide will rapidly form under disturbances in operation, which deposits are successively built-up and result in blocking of the apparatus. As a rule, this requires interruption of the operation for a certain period of time for mechanical cleaning of the apparatus in question, which results in reduced production of sulphuric acid, iron oxide and arsenic trioxide. The deposits in the apparatus are very hard and are firmly attached to the apparatus. Therefore, the cleaning operation is time-consuming and, moreover, it is difficult to carry out from an industrial hygiene point of view because of dust problems. Furthermore, the removed deposits constitute an environmental problem, since it is difficult to dispose of the material which is not well suited for recirculation to the evaporating plant. Another disadvantage with the above-mentioned methods is the fact that in the washing of the gas, contaminants other than arsenic trioxide will be captured, which in their total amount will contaminate the recovered arsenic trioxide product.

The present invention has for its purpose to enable recovery of the arsenic trioxide while avoiding corrosion and formation of non-desired deposits in the apparatus, where the washing-out of the arsenic trioxide is done in a closed system under a continuous supply of the gas to be purified. No waste solutions are formed which must undergo purification.

The invention is based on the surprising discovery that an unsaturated arsenic trioxide solution has the ability of relatively quickly dissolving arsenic trioxide deposits formed in connection with recovery of the arsenic trioxide. Since this means that formed arsenic trioxide deposits can be removed by means of aqueous solutions, the technique of the invention results in prevented corrosion. Moreover, it is possible to obtain such a cleaning of the apparatus that a thin corrosion-inhibiting coating of arsenic trioxide is allowed to remain on the treated surfaces.

Thus, the invention provides for a process for recovering arsenic trioxide from a gas by washing out said oxide from the gas with a liquid having the ability of dissolving arsenic trioxide. The arsenic trioxide is recovered from the solution thereby obtained by crystallization from a saturated solution. The invention is thus characterized in that non-desired deposits in the apparatus formed in connection with the saturated solution are removed by dissolution with an unsaturated solution of arsenic trioxide.

In principle, the removal of arsenic trioxide by means of an unsaturated solution can be carried out in two different ways. Thus, in one and the same system it is possible to operate alternatingly with a saturated and unsaturated solution of arsenic trioxide. Another way is to carry out the washing and the crystallization in at least two systems arranged in parallel, one system being operated under saturation with regard to arsenic trioxide, whereas the other system is operated under an unsaturated condition, the operational conditions of the systems being shifted at different time intervals. Thus, in the first case, shifting between saturated and unsaturated condition takes place in the time dimension, i.e. at different times, whereas in the latter case using systems coupled in parallel the shifting takes place in the space dimension, i.e. in different areas.

A particular embodiment of the process of the invention which is generally applicable when continuously removing contaminants from a gas by washing the gas with a liquid dissolving said contaminants is comprised by the steps of washing the gas continuously in a first system with an essentially saturated solution of arsenic trioxide, partially evaporating in the first system the essentially saturated solution to obtain precipitation of arsenic trioxide, removing the precipitated arsenic trioxide from the system, continuously washing the gas in a second system with an unsaturated solution of arsenic trioxide, adding to the second system liquid in an amount to maintain unsaturation in the solution, transferring unsaturated solution from the second to the first system, and, when the arsenic trioxide has formed a non-desired deposit in the first system, operating said system with unsaturated solution to dissolve the deposit and operating the other system with an essentially saturated solution.

The invention also provides for an apparatus for carrying out the process, said apparatus comprising: at least two scrubbers 1A; 2A coupled in parallel, and associated crystallizers 6A; 6B and gas coolers 2A; 2B and a conduit means for maintaining a circulation system of wash liquid for each scrubber, a common pump receiver 3 divided into sections 3A; 3B, one section for each circulation system, conduit means 8 and switching means 10A; 10B for passing liquid condensed in the gas coolers 2A; 2B to the section(s) 3A containing saturated solution, and means 12 for transferring solution from last-mentioned section or sections 3A to the section 3B containing saturated solution.

The present invention automatically solves the environmental problems connected with the prior art in view of the fact that the invention operates with a closed system so that the amount of waste solution is lowered to a minimum. Moreover, the invention results in an essential economical saving, since by using the technique of the invention it is not necessary to shut down the plant for a longer period of time for removal of the deposits formed. In addition to the economical saving, improved industrial hygiene conditions are obtained, since deposits formed in the apparatus no longer need to be removed by hand in a tedious and time-consuming manner. A further economical advantage resides in increased production in view of the fact that the process of the invention enables continuous operation, which above all results in a more uniform and increased sulphuric acid production.

The invention will now be more closely illustrated in connection with the appended drawings, which diagrammatically show three different plants for applying the technique of the instant invention.

Thus,

FIG. 1 shows a simple system for recovering arsenic trioxide from hot gas having a temperature of for instance 300°–500°C, whereas

In the embodiments to be described below reference is had to recovery of arsenic trioxide from hot sulphur dioxide-rich gases obtained by the roasting of pyrites. The gas has a temperature level of 300°–400°C and contains, in addition to arsenic trioxide, iron oxide dust, sulphur trioxide and certain other contaminants.

Figure 1:
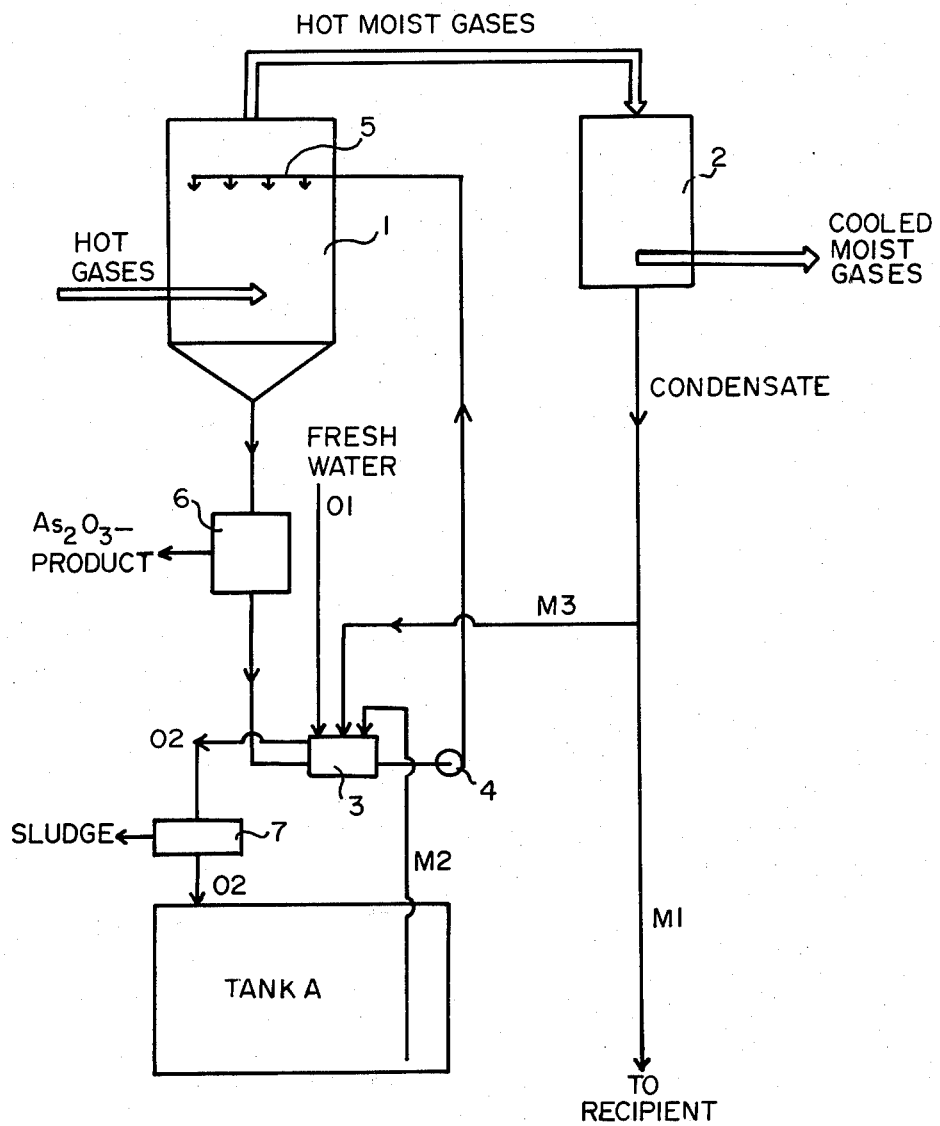

The plant shown in FIG. 1 contains a scrubber or washing device 1, wherein hot gas is brought into contact with circulating wash liquid. The washed gas which is now hot and moist is transferred to a gas cooler 2, wherein the gas, in a manner not shown in detail is cooled while condensing steam present therein. The plant includes also a crystallizer 6, wherein arsenic trioxide is recovered, a pump receiver 3, a circulation pump 4 and a buffer tank A for arsenic trioxide solution. The wash liquid is distributed in the scrubber 1 by means of a distributor 5, and for treating wash liquid transferred from the pump receiver 3 to the tank A a filter press 7 is provided for removal of sludge present in the wash liquid.

When using the system according to FIG. 1, it is assumed that the apparatus initially is well cleaned and free from deposits of arsenic trioxide. Moreover, it is assumed that the buffer tank A is completely filled with non-saturated arsenic trioxide solution. When the process is started, the wash liquid circulating in circuit 1, 6, 3, 4, 5 will be evaporated in the scrubber 1 by heat supplied from the hot gas. The water thereby vaporized is transferred together with the washed gas to the gas cooler 2, wherein the main part of the water steam is condensed by indirect cooling with a suitable cooling medium. Remaining water in the form of steam accompanies the discharged cooled gas which is transported on for its intended use. In this operation the whole amount of condensate is discharged to the outlet or recipient as flow M1. In order to compensate for the loss of water in the scrubber 1, solution containing arsenic trioxide is supplied from the buffer tank A to the pump receiver 3 as flow M2.

The result of this form of operation will be that the evaporization of pure water is compensated for with the water solution of arsenic trioxide, continued evaporization followed by crystallization of arsenic trioxide being the result. The arsenic trioxide will be obtained in the crystallizer 6 by conventional crystallization procedures, which is more closely illustrated below.

When the contents of the buffer tank A have been consumed, operation under saturated conditions can proceed without any supply of arsenic trioxide to the system other than that supplied with the hot roasting gas. In this condition it may be advantageous to recirculate the condensate from the gas cooler 2 to the pump receiver 3 as flow M3, whereby flow M1 will cease. As required, fresh water is added to the pump receiver 3 as flow 01 to replace evaporized water.

As the system is now operated under saturated conditions and with the crystallization of arsenic trioxide, deposits of arsenic trioxide will be formed in the apparatus, and when these deposits have reached a certain extent, the system is switched over to the unsaturated operation. This can be done at any time provided that the level of the buffer tank A is not too high. It is, however, not a requirement that the buffer tank A shall be completely emptied when unsaturated operation conditions are commenced.

When passing from the unsaturated operation, flows M1 and M2 are interrupted at the same time as flow M3 is maintained. In order to provide the washing out of the arsenic trioxide deposits in the circulation system 1, 6, 3, 4, 5, great amounts of fresh water are now supplied to the pump receiver 3 through flow 01. The fresh water supplied results in dilution of the circulating wash liquid so as to increase the level of the pump receiver 3. To counteract this increase of the level, great amounts of wash liquid are therefore continuously withdrawn from the pump receiver 3 to the buffer tank A, which takes place through the filter press 7 as flow 02. This will result in removal of arsenic trioxide solution from the system and replacement with pure water. In this continuous circulation of unsaturated arsenic trioxide solution, which can be considered as an eluation with fresh water, washing out of the arsenic trioxide content of the hot gas as well as the deposits in the apparatus will take place, which is a characteristic of the operation under unsaturation. The arsenic trioxide will be transferred to the buffer tank A in the form of a dilute aqueous solution, at the same time as the recovery of arsenic in the crystallizer 6 ceases.

When the desired removal of the arsenic trioxide deposits by washing has been reached, flows 01 and 02 are interrupted resulting in renewed operation under saturated conditions. This means that the dilute arsenic trioxide solution transferred to the buffer tank A can be worked-up to obtain an arsenic trioxide as a product under saturated operation. The operation may then be switched over to unsaturated operation and repeated shifts between the different forms of operation may be carried out any number of times.

For environmental protection and with regard to the buffer tank A, severe requirements with regard to availability and safety must be fulfilled. The consequences of a shut-off of the buffer tank A for service during a period when the operation in other respects cannot be interrupted may be far reaching. Therefore, it may be advantageous from a practical point of view to arrange an auxiliary tank to supplement tank A.

Moreover, with regard to the environmental protection aspect, it is to be noted that the condensate discharged as flow M1 in FIG. 1 to a sewer must be subjected to chemical purification before the discharge can be permitted. If this condensate could be used to a greater or lesser extent, for washing out arsenic trioxide deposits under the unsaturated operation, certain savings in cost could thus be obtained. With regard to the quantity of condensate utilized in the system in this way, the chemical purification is avoided and simultaneously the corresponding water cost is lowered. To make such utilization of the condensate, it can be transferred to the buffer tank A, but this results in a lowered arsenic level, which results in reduced recoverage capacity.

Figure 2:
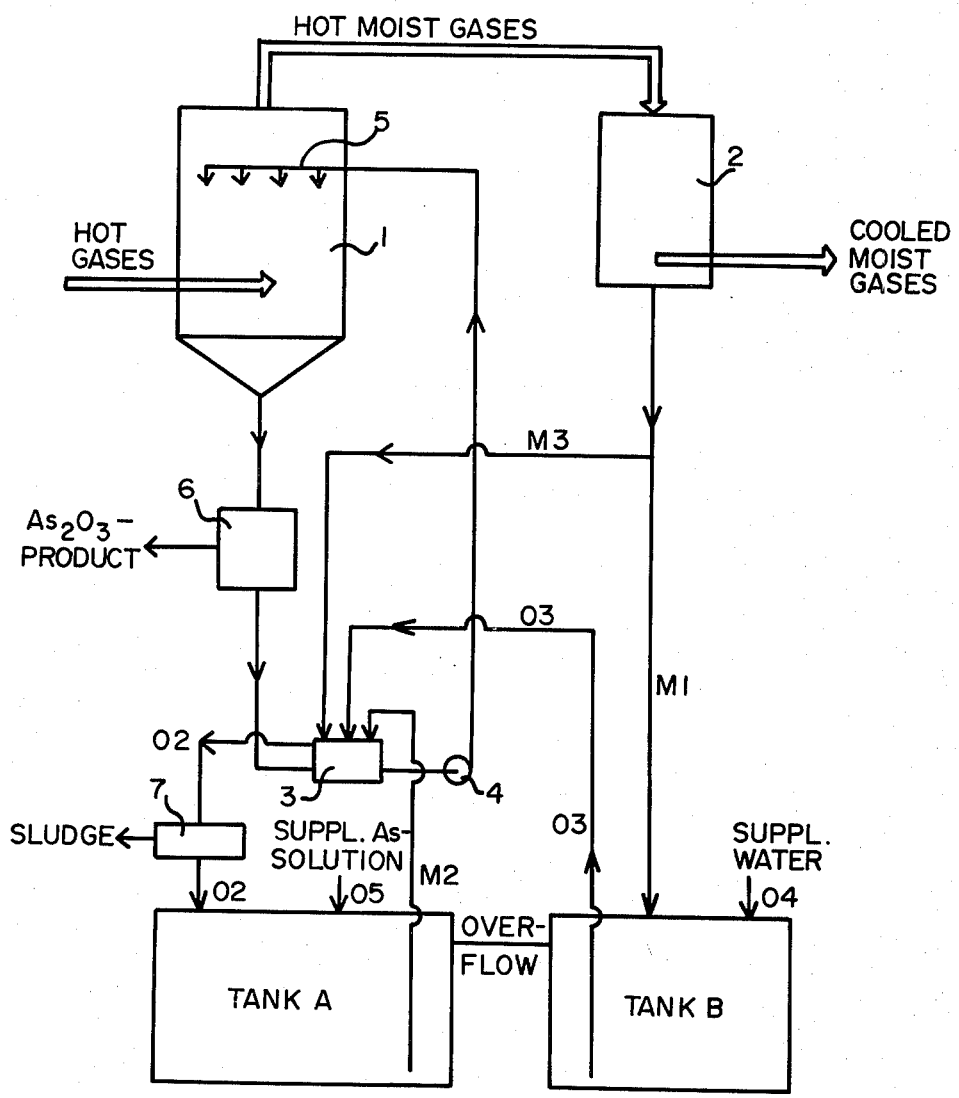
FIG. 2 shows a system modified in relation to that of FIG. 1 and containing a supplementary reserve tank.

Against the background of the above points of view, a system in conformity with FIG. 2 has been developed using two buffer tanks A and B. In other respects, the system corresponds to that shown in FIG. 1. In operating the plant according to FIG. 2, it is assumed that the buffer tank A is initially filled whereas the buffer tank B is empty. The wash liquid circulating in the scrubber circuit 1, 6, 3, 4, 5 is evaporized by using the heat supplied with the hot gas. The condensate from the gas cooler 2 is supplied to the buffer tank B as flow M1. In order to compensate for the water loss in the scrubber 1, arsenic trioxide-containing solution from the buffer tank A is supplied to the pump receiver 3 as flow M2. As previously noted, the arsenic trioxide recovery takes place in the crystallizer 6. In view of the removal of water together with discharged cooled gas, the sum of the amounts of water in the buffer tanks A and B will be reduced. This can be compensated by a supply of arsenic solution to the buffer tank A as flow 05 or by a supply of fresh water directly into the circulation circuit or to the buffer tank B as flow 04.

If the buffer tank A is emptied without the arsenic deposits in the scrubber 1 having reached such an extent that washing-out is necessary, shifting to saturated operation can be made with tanks A and B shut off. In this connection, flows M1 and M2 are interrupted at the same time as the condensate from the gas cooler 2 is supplied directly to the pump receiver 3 as flow M3. Possible loss of water in addition thereto in the circulation system is compensated for with fresh water. The recovery of arsenic trioxide will in this case be delimited to the amount supplied with the hot gas.

When switching over to unsaturated operational conditions, flow M3 is maintained at the same time as great amounts of condensate are transferred from the buffer tank B to the pump receiver 3 as flow 03. The excess in the pump receiver 3 is transferred through the filter press 7 to the buffer tank A as flow 02, while separating the sludge. During this period of the washing out of formed arsenic trioxide deposits, the recovery of arsenic trioxide is completely at a stop.

The liquid successively transferred from the buffer tank A to the buffer tank B during the preceding period of saturated operational conditions is now returned to the buffer tank A under unsaturated operation. When there is a deficit of liquid, the wash circuit is supplied with fresh water. When the washing out of the arsenic trioxide deposits has been finalized, switching to saturated operational conditions according to the previous description is effected.

When the buffer tanks A and B exclusive of necessary extra buffer volume together are filled up to about half of their volume at normal operational conditions, there are good possibilities at a failure of one of the buffer tanks to transfer its contents of liquid to the other buffer tank. In this condition, the recovery of arsenic trioxide may be upheld while using the technique described in connection with FIG. 1, i.e., a relatively great discharge of condensate and a certain transfer of arsenic trioxide solution to the tank, if the whole amount of condensate cannot be treated chemically and discharged in the sewer. Such transfer between the buffer tanks is indicated in FIG. 2 with the conduit "overflow".

In connection to FIGS. 1 and 2 above, there have been described simple scrubber systems, wherein alternatingly operation is effected in the saturated and unsaturated condition, respectively. In connection with FIG. 3, a plant having two scrubber systems coupled in parallel will be described, of which one is operated under saturated conditions, whereas the other is operated under unsaturated conditions. Also in this figure, the different plant units have been indicated with the same reference numerals as the corresponding units of FIGS. 1 and 2.

Figure 3:
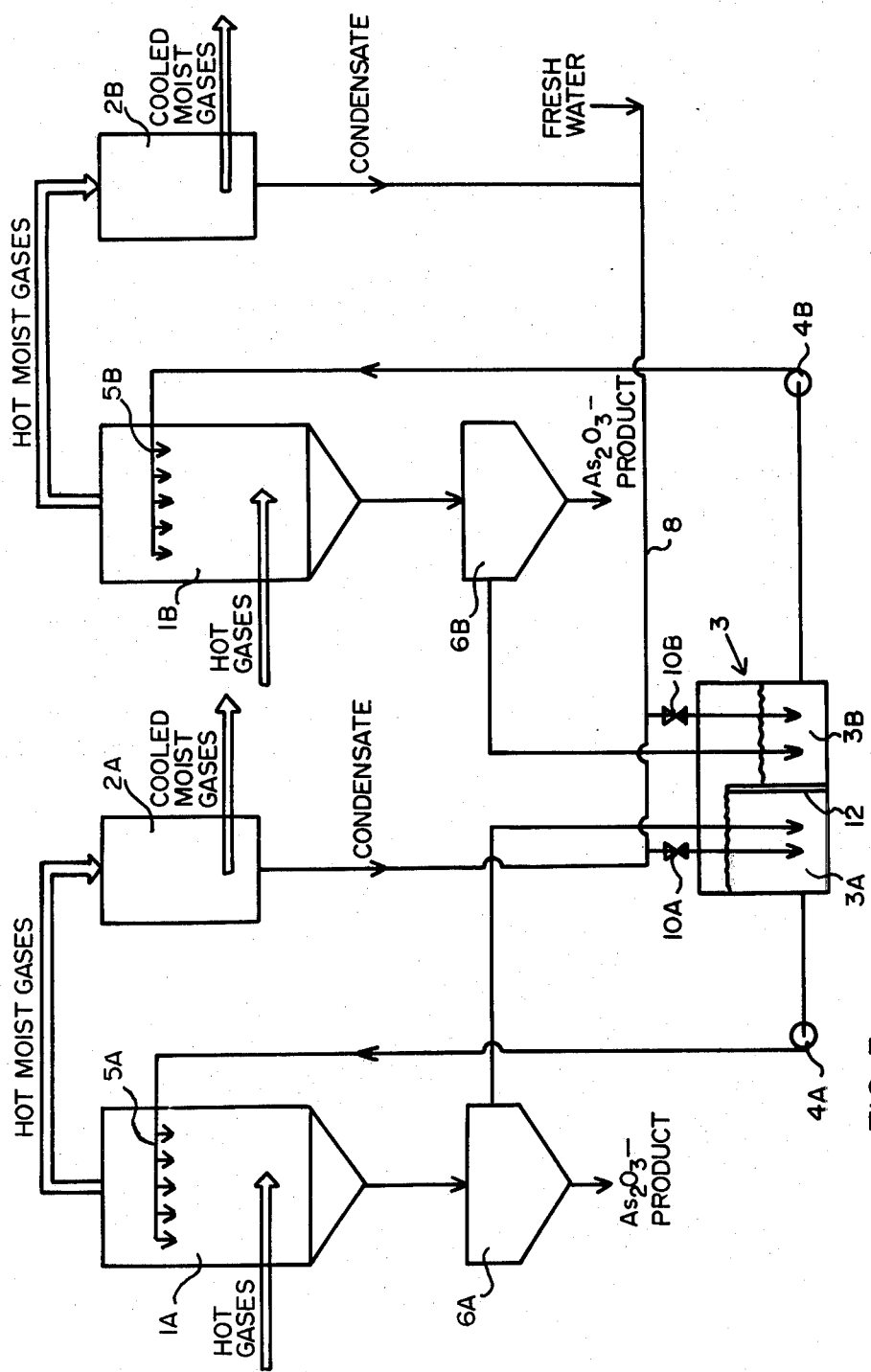
FIG. 3 shows a plant containing two systems coupled in parallel. In the different drawing figures the same reference numerals refer to the same details of the plant.

According to FIG. 3, the plant shown contains one system A and one system B. In the assumed initial state, the hot gas supplied is divided up with one half for each of the scrubbers, 1A, 1B. In these scrubbers the gas is washed as previously indicated and the wash liquid is transferred to crystallizer 6A and 6B, respectively, where crystallized arsenic trioxide is allowed to settle. From the crystallizers the clear liquid containing dissolved arsenic trioxide is passed to the pump receiver 3A, 3B, which by means of a partition wall 12 is divided into two sections (A and B, respectively). As previously indicated, the washed hot moist gas is passed to gas coolers 2A, 2B and the condensates therefrom, optionally brought together, with added fresh water are introduces to common conduit 8, from which the liquid can be supplied to the sections of the pump receiver through valves 10A, 10B. The partition wall 12 of the pump receiver enables any excess of liquid in one of the sections to compensate for a deficit in the other section.

Two operational conditions are now conceivable. In a first operational condition valve 10A is open and valve 10B is closed, and in another operational condition valve 10A is closed and valve 10B is open. Now assume that the first of these operational conditions is at hand. The evaporation of wash liquid in the scrubbers 1A and 1B is the same in view of the same supply of gas. In view of the indicated positions of valves 10A and 10B the water condensed from gas coolers 2A and 2B optionally together with supplied fresh water will, however, be supplied only to section 3A of the pump receiver 3. Thus, section 3B does not obtain any compensation for evaporated water. This results in a successively increasing level in section 3A, until overflow takes place at partition wall 12 to section 3B. The amount of liquid flowing from section 3A to section 3B corresponds to the evaporization in scrubber 1B. The result of this is that dissolved compounds present in the wash liquid of section 3A are transferred with the wash liquid to section 3B. At continuous transfer in this manner of dissolved compounds from section 3A to section 3B, the concentration level of section 3B and thereby, also of the B-system, will successively increase until the level of saturation is reached, whereafter continued supply of dissolved substances results in crystallization in the B-system. In view of the fact that substances dissolved in the liquid are transferred from system A to system B in this way, the solution of system A will remain unsaturated, whereas the liquid of system B will always be saturated after some time of operation.

Thus, in this manner, all of the arsenic trioxide supplied with the hot gas to scrubbers 1A and 1B will be recovered in system B. By crystallization in the crystallizer 6B a quantity may be withdrawn corresponding to the production of crystals. This first operational condition is thus characterized by the fact that all parts of the apparatus of system A contacting liquid are in direct contact with unsaturated arsenic trioxide solution which cannot cause crystallization and formation of deposits in the apparatus. In this operational condition, system B will receive all arsenic trioxide supplied. Normally, this results in a certain crystal formation on the interior surface of the apparatus coming into contact with the saturated solution of system B. In order to prevent this deposit from becoming too thick and thereby to avoid operational shut down for cleaning the apparatus, it is necessary, that the liquid-contacted parts are brought into contact with unsaturated solution for a period of time such that non-desirable deposits will have time to dissolve. Thus, by switching over to the other operational condition, i.e., close valve 10A and open valve 10B, such a condition will be obtained in system B. The overflow over partition wall 12 in the pump receiver 3 will now take place in the opposite direction, i.e., from section 3B to section 3A, and analogous to the case of system B in the first operational condition, the withdrawal of product will now take place in crystallizer 6A of system A, since this system will now be operated with a saturated solution. Switching between the saturated and unsaturated system can be made depending on the degree of formation of deposits in the respective systems. This also enables control of the degree of dissolution of the deposits, and since the deposits result in a certain corrosion-protecting effect, it is desirable to leave part of the deposits on the surfaces of the apparatus contacted by the liquid, which is possible by the process of the invention. It should also be observed that the operational continuity may be maintained during the switching periods, since the supply of gas to both systems may be constantly upheld.

The plant described in connection with FIG. 3 contains two parallel systems, but there is no obstacle against connecting more than two parallel systems to the pump receiver. In this case it is suitable to operate one system with saturated solution, whereas the others are operated with unsaturated solutions.

In the crystallizers 6A and 6B (FIG. 3) a floating crystal mass is always in contact with supersaturated solution. In view of the fact that arsenic trioxide crystallizes relatively slowly from solution, the course of crystallization can be easily controlled so as to adapt the characteristics of the product to the intended use thereof. The process of the invention results in essential practical advantages. In view of the fact that formed deposits of arsenic trioxide can be easily removed in the manner indicated above, hot gas can be supplied continuously to the system, whereby the plant obtains increased capacity. Since the technique of the invention enables use of water as a wash liquid, iron sulphate present can be separated more easily than in the prior art processes which use sulphuric acid as the wash liquid, since there is a great difference in solubility between arsenic trioxide and iron sulphates in water. Another advantage of the invention when applied to several circuits connected in parallel, for instance in conformity with FIG. 3, is the fact that the product, arsenic trioxide, can be obtained with a high purity, since in the unsaturated circuit or circuits, foreign substances capable of settling can be removed in a corresponding crystallizer or crystallizers. The more systems connected in parallel present in the plant, the purer the arsenic trioxide product obtained. In this connection it should be noted, as previously indicated, that the embodiment according to FIG. 3, having two or more circuits connected in parallel is applicable in all processes, where it is desirable to continuously remove a substance from a gas by washing the gas with a liquid dissolving the substance.

Various modifications and equivalents will be apparent to those skilled in the art and may be made in the processes and the apparatus of the present invention, and it is therefore to be understood that the invention is to be limited only by the scope of the appended claims.

What is claimed is:

1. In a process for recovering arsenic trioxide from a gas by washing out said oxide from the gas with a liquid having the ability of dissolving arsenic trioxide, said oxide being recovered from the obtained solution thereof by crystallization from a saturated solution, the improvement which comprises removing non-desirable deposits in the apparatus formed in connection with the saturated solution by dissolution with an unsaturated solution of arsenic trioxide in a closed system and under a continuous supply of gas.

2. The process according to claim 1 further comprising operating in one and the same recovery system with alternatingly saturated and unsaturated solutions of arsenic trioxide.

3. The process according to claim 1 wherein the washing out and crystallization are carried out in at least two systems operated in parallel, one system being operated under saturation with regard to arsenic trioxide, and the other system being operated under an unsaturated condition, the operational conditions of the system being shifted from time to time so as to prevent excessive build-up of deposits of arsenic trioxide.

4. The process according to claim 3 further comprising washing the gas continuously in a first system with an essentially saturated solution of arsenic trioxide, partially evaporating in the first system the essentially saturated solution to obtain precipitation of arsenic trioxide, removing the precipitated arsenic trioxide from the system, continously washing the gas in a second system with an unsaturated solution of arsenic trioxide, adding to the second system, liquid in an amount to maintain unsaturation in the solution, transferring unsaturated solution from the second system to the first system, and, when arsenic trioxide has formed a non-desired deposit in the first system, operating said system with the unsaturated solution to dissolve the deposit and operating the second system with an essentially saturated solution.

5. The process according to claim 3 wherein the dissolution of the non-desired deposits is carried out only for a time period sufficient to leave a corrosion-protecting layer.

6. In an apparatus for recovering arsenic trioxide from a gas containing the same, said oxide being obtained by crystallization from a saturated solution used to scrub the gas, and being of the type composed of at least two scrubbers (1A; 1B) coupled in parallel, and associated crystallizers (6A; 6B) and gas coolers (2A; 2B) and conduit means for maintaining a circulation system of wash liquid for each scrubber, a common pump receiver (3) divided into sections (3A; 3B), and one section for each circulation system, the improvement which comprises conduit means (8) and switching means (10A; 10B) for passing liquid condensed in the gas coolers (2A; 2B) to the section (3A) containing unsaturated solution, and means (12) for transferring solution from section (3A) to section (3B) containing a saturated solution.

7. Apparatus according to claim 6, characterized in that said transfer means consist of partition walls (12) arranged between the sections (3A; 3B) which in both directions act as over-flows.

8. An apparatus according to claim 6, characterized in that said switching means consists of openable and closable valves (10A; 10B), respectively, whereby liquid condensed in the gas coolers (2A; 2B) can be passed to the section(s) (3A), containing unsaturated solution.

* * * * *